United States Patent
Falk et al.

[15] 3,640,772
[45] Feb. 8, 1972

[54] METHOD OF PRODUCING AN ELECTRODE FOR ALKALINE BATTERIES

[72] Inventors: Sven Uno Falk; Lars-Goran Alfelt, both of Oskarshamn, Sweden

[73] Assignee: Svenska Ackumulator Aktiebolaget Jungner, Oskarshamn, Sweden

[22] Filed: June 3, 1969

[21] Appl. No.: 15,445

[30] Foreign Application Priority Data

Aug. 21, 1968 Sweden..................................11265/68

[52] U.S. Cl. .............................136/67, 136/75, 136/120 R
[51] Int. Cl. .........................................................H01m 35/26
[58] Field of Search ..............................136/64, 75, 28–29, 136/25, 24, 20, 120, 67; 264/111, 105, 127

[56] References Cited

UNITED STATES PATENTS

| | | | |
|---|---|---|---|
| 3,024,296 | 3/1962 | Adler | 136/24 |
| 3,060,254 | 10/1962 | Urry | 136/24 |
| 3,120,457 | 2/1964 | Duddy | 136/120 |
| 3,121,029 | 2/1964 | Duddy | 136/19 |
| 3,184,339 | 5/1965 | Ellis | 136/75 |
| 3,282,738 | 11/1966 | Langer et al. | 136/120 |
| 3,347,668 | 10/1967 | Clark et al. | 136/120 X |
| 3,457,113 | 7/1969 | Deibert | 136/86 |

*Primary Examiner*—Anthony Skapars
*Attorney*—Sughrue, Rothwell, Mion, Zinn & Macpeak

[57] ABSTRACT

A method for producing electrodes for alkaline batteries, the steps of which comprise pressing a dry pulverized mixture of an electrochemically active material, a conductive inert material and an organic bonding agent onto an electrically conductive base, said electrochemically active material having been first treated with a solution of an electrolyte-resistant polymer in the solvent, removing the solvent from the polymer-treated active material, grinding the polymer-treated active material into a suitable particle size, mixing said ground polymer-treated active material with an inert conductive material of the same composition in a larger quantity by weight than the aforesaid conductive material, and pressing the resulting mixture onto an electrically conductive base and into a continuous accumulator grid.

10 Claims, No Drawings

METHOD OF PRODUCING AN ELECTRODE FOR ALKALINE BATTERIES

The invention relates to a method of producing an electrode for alkaline batteries by pressing a dry powder mixture consisting of electromechanically active material, conductive inert material and an organic bonding agent, on an electrically conductive base.

An earlier known method of producing alkaline batteries is to apply to a metallic carrying member a viscous mixture of active material, conductive material and an organic bonding agent dissolved in a solvent, after which the mixture is dried and pressed onto the carrying member.

A disadvantage of such a procedure is that, in drying of the mixture, cracks and other defects are very liable to arise in the latter, whereby the mechanical properties of the electrode are essentially reduced. This is a considerable disadvantage in electrodes which are to be spirally wound or folded in a zigzag pattern. Another disadvantage of earlier known procedures is that it was impossible to control the distribution and structure of the bonding agent in the electrodes so produced, as a result of which the bonding agent often blocked the active material or isolated the conductive material and therefore impaired the electrical properties of the electrodes. To reduce the risk of this blocking action, very small quantities, about 1–2 percent, of bonding agent have hitherto been used, which in turn has resulted in serious impairment of the strength of the electrodes.

The present invention relates to a method of manufacturing electrodes of this kind, with improved mechanical and electrical properties, and consists essentially in the fact that the electromechanically active material in powder form, possibly with the addition of a small quantity of conductive powder material, is first treated with a solution of an electrolyte-resistant, preferably cold-weldable polymer in a solvent, after which the solvent is removed from the polymer-impregnated active material, which is then ground to a suitable particle size and mixed with an inert conductive material of the same or other kind and in a greater quantity by weight than the former, and is finally pressed onto an electrically conductive base into a continuous accumulator grid.

Since the greater part of the conductive material is mixed with dry, polymer-impregnated active material, good contact is formed between the conductive material and the active material. If, according to the invention, one first treats the active material with a solution of an electrolyte-resistant polymer, e.g., polyethylene, in a solvent, e.g., xylene, the polymer—on removal of the solvent—will be precipitated in very porous and finely divided form on the active material. As the latter undergoes considerable changes of volume during the working cycle of the electrode, openings are produced in the polymer layers which permit good contact between the active material and the nonpolymer-treated conductive material. The diffusion of the electrolyte in the electrode and its access to the active material are hereby facilitated. It has proved that, if the conductive material is added to the active material before the treatment with the polymer solution takes place, the electrical characteristics of the final electrode are clearly impaired due to the fact that the electrically conductive material becomes fully or partially isolated.

The invention is suited for the manufacture both of positive and negative electrodes for alkaline batteries. The electrochemically active material may consist of an oxide or hydrated oxide of one of the metals nickel, cobalt, cadmium, iron, zinc or silver, or of a mixture of them. The invention is especially well suited for the manufacture of cadmium and nickel hydroxide electrodes. The bonding agent consists of an electrolyte-resistant polymer, which is recommended should be cold weldable, preferentially a polyolefine such as polyethylene, polypropylene, etc. The electrodes can then be pressed at room temperature, which is a considerable advantage.

The method of admixture of the polymer bonding agent according to the invention makes it possible to use relatively high contents of the bonding agent, 5–12 percent by weight, without impairment of the electrical characteristics of the electrodes. This gives the electrodes excellent strength properties, which makes them especially well adapted to types of accumulator cells in which spirally wound or otherwise bent electrodes are used. The solvent consists preferentially of an aromatic hydrocarbon, e.g., xylene, toluene, etc. The removal of the solvent is done by known methods, e.g., through evaporation with or without vacuum, extraction, etc. If evaporation is used, it is advantageous that it takes place relatively slowly so that the precipitated polymer is obtained in as finely divided a form as possible. The electrically conductive material may consist of graphite or of a metal powder, e.g., nickel powder.

Some examples of the method of manufacture according to the invention are described below. The examples are, of course, not limited either in respect of the constituents of the final electrode or of their relative proportions.

EXAMPLE 1

Seventy-three parts by weight of nickel hydroxide powder were mixed with a roughly 80° C. solution of 10 parts by weight of polyethylene powder dissolved in xylene. To obtain a suitable viscosity of the mixture, 12 ml. xylene were used per g. polyethylene. The solvent was then removed by evaporation under vacuum, whereupon the dried mixture was ground together with about one-third of the 17 parts by weight of conductive material, which consisted of a fine-grained graphite powder with a particle size of essentially 5–10 $\mu$m. By adding a small quantity of graphite in the grinding of the dried, polymer-impregnated active material, the effects of the static electrical properties of the polymer-treated active material were eliminated. The mixture was then screened through a 50-mesh screen (U.S. Bureau of Standards) and mixed with the remainder of the graphite in a mixer for 15 minutes. From this mixture grids sized 35×200 mm. were pressed in a compression mold. The grids were reinforced with a nickel gauze of the same size as the grid. To center the nickel gauze in the grid, about half the quantity of the mixture was first distributed uniformly in the mold. Above this layer the nickel gauze was placed after being flat pressed with a pressure of about 150 kp./cm.$^2$, after which the remaining quantity of the mixture was applied in a uniform layer on the nickel gauze. Pressing was then done at room temperature at a pressure of about 800 kp./cm.$^2$, whereby grids were obtained about 0.60 mm. thick. The grids were tested in respect of efficiency and loading properties. After 16 cycles at a current of 0.2×C amperes, where C is the numerical value for the nominal capacity in Ah, the grids exhibited an efficiency averaging 95 percent, which is fully on a level with the performance of corresponding sintered grids. The electrical loading capacity was also satisfactory. With a discharge current of 1×C ampere at room temperature, the capacity was 91 percent of that obtained with a discharge current of 0.2×C ampere. The corresponding value with 2×C ampere at room temperature was 82 percent, and with 1×C ampere at −20° C. 68 percent. The electrodes exhibited good mechanical properties and could be bent and spirally wound without the active layers of the mixture scaling off the base.

EXAMPLE 2

Seventy-three parts by weight of nickel hydroxide powder and 5 parts by weight of graphite powder were mixed and then stirred into a 80° C. solution of 10 parts by weight of polyethylene powder dissolved in xylene. After the solvent had evaporated, the mixture was ground and screened and then intimately mixed with 12 parts by weight of graphite powder. The powder mixture was applied to a nickel gauze and pressed at about 800 kp./cm.$^2$ by the same procedure as in Example 1.

The grids were tested in respect of efficiency and loading capacity. After 16 cycles with a current of 0.2×C amperes they exhibited an efficiency of 90 percent, which is 5 percent lower than from the corresponding grids manufactured according to Example 1. The electrical loading properties were slightly inferior to those for the grids in Example 1.

EXAMPLE 3

Seventy-three parts by weight of nickel hydroxide powder and 12 parts by weight of graphite powder were mixed with a solution of 10 parts by weight of polyethylene powder dissolved in xylene. The mixture was dried, ground and mixed with 5 parts by weight of graphite powder, and pressed into grids by the procedure indicated in Examples 1 and 2.

The efficiency for these grids during cycles 1–6 fell from 34 percent to 26 percent. This result must be regarded as altogether unacceptable.

EXAMPLE 4

Eighty-five parts by weight of cadmium oxide were mixed with 80° C. solution of 5 parts by weight of polyethylene powder dissolved in xylene to form a viscous paste. The paste was dried, ground and screened through a 50-mesh screen and then thoroughly mixed with 10 parts by weight of carbonyl nickel powder. The dry powder mixture was then applied to both sides of a fine-meshed nickel gauze and pressed at room temperature into grids at a pressure of 800 kp./cm.$^2$. The grid size was the same as in the preceding example, i.e., 35×200 mm. and thickness about 0.45 mm.

After six charging and discharging cycles the grids exhibited an efficiency of 65–70 percent, which must be considered a very good result, fully comparable with that shown by sintered electrodes which are considerably more expensive to manufacture. In loading properties these grids were also fully on a level with sintered grids.

These examples show clearly that, to obtain electrodes with good electrical properties, the greater part of the conductive material should be added to the active material after the latter has been impregnated with the bonding agent.

Although the present invention has been adequately described in the foregoing specification and examples included therein, it is readily apparent that various changes and modifications may be made without departing from the spirit and scope thereof.

What we claim is:

1. A method for producing electrodes for alkaline batteries, the steps of which comprise:
   a. mixing a dry pulverized electrochemically active material with a small quantity of conductive material,
   b. treating the mixture of a. with a solution of an electrolyte-resistant polymer in a solvent,
   c. removing the solvent from the polymer-treated active material,
   d. grinding the polymer-treated active material into a suitable particle size,
   e. mixing said ground polymer-treated active material with an inert conductive material of the same composition in a larger quantity by weight than the aforesaid conductive material, and
   f. pressing the resulting mixture onto an electrically conductive base and into a continuous accumulator grid.

2. The method of claim 1, wherein the electrolyte-resistant polymer is cold weldable.

3. The method of claim 1, wherein the electrochemically active material is a member selected from the group consisting of the oxide of nickel, cobalt, cadmium, iron, zinc, silver and mixtures of the same.

4. The method of claim 1, wherein the electrochemically active material is a member selected from the group consisting of the hydrated oxides of nickel, cobalt, cadmium, iron, zinc, silver and mixtures of the same.

5. The method of claim 1, wherein the electrolyte-resistant polymer is polyolefin.

6. The method of claim 1, wherein the pressing of the electrodes is carried out at room temperature.

7. The method of claim 1, wherein the content of the electrolyte-resistant polymer ranges from 5 to 12 percent by weight of the polymer-containing mixture of the electrochemically active and conductive inert material.

8. The method of claim 1, wherein the solvent is an aromatic hydrocarbon.

9. The method of claim 8, wherein the aromatic hydrocarbon is a member selected from the group consisting of xylene and toluene.

10. The method of claim 5, wherein the polyolefin is a member selected from the group consisting of polyethylene and polypropylene.

* * * * *